J. BABCOCK & J. F. STILSON.
Stalk-Cutters.
No. 153,416. Patented July 28, 1874.
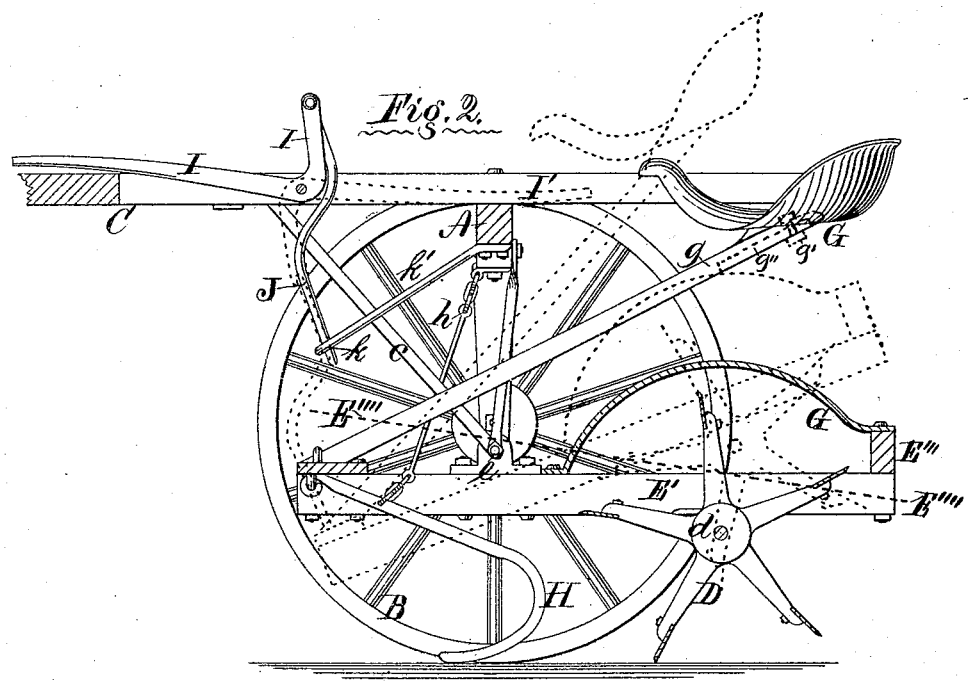
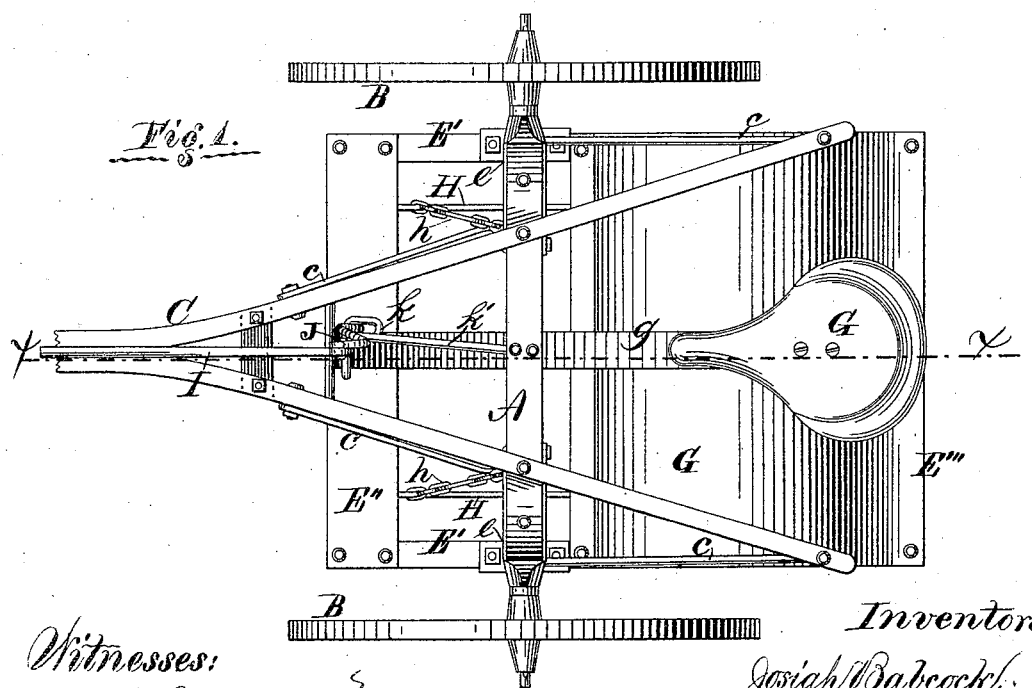

UNITED STATES PATENT OFFICE.

JOSIAH BABCOCK AND JOHN F. STILSON, OF GALESBURG, ILLINOIS.

IMPROVEMENT IN STALK-CUTTERS.

Specification forming part of Letters Patent No. 153,416, dated July 28, 1874; application filed February 12, 1874.

*To all whom it may concern:*

Be it known that we, JOSIAH BABCOCK and JOHN F. STILSON, of Galesburg, county of Knox and State of Illinois, have invented certain new and useful Improvements in Stalk-Cutters, of which the following is a specification:

This invention relates to a machine for cutting corn and other kinds of stalks into short lengths in the field, for the purpose, generally, of facilitating the process of turning them under with a plow; and it consists, first, in the combination and arrangement of the stalk-cutter devices proper, with an ordinary cultivator-frame; second, in the manner of pivoting the frame, carrying the cylinders of cutters to the cultivator, or truck-frame, or axle, in such manner that the cylinder of cutters may be used as a fulcrum upon which to vibrate its said carrying-frame, and throw the additional weight of the axle and wheels upon the cutters when desired; third, in connecting and arranging the driver's seat and its supporting-bar with the vibrating cutter-frame in such manner that by shifting his seat he may accomplish the aforesaid result; fourth, in the arrangement of a bent lever and toggle-arm for holding the cutter-frame in an elevated position, all substantially as described, and for the purpose specified.

To enable others skilled in the art to make and use our invention, we will proceed to describe the same with reference to the accompanying drawing, in which—

Figure 1 is a top or plan view of a machine embodying our invention. Fig. 2 is a vertical section of the same in the plane of the line $xx$, Fig. 1.

The similar letters used as marks of reference indicate the same parts in all of the figures.

Letter A represents a centrally-elevated and ordinary cultivator-axle supported on wheels B B and provided with a tongue or draft-pole, C, with braces $c\ c$. D is the cylinder of cutters, carried on a shaft, $d$, which has suitable bearings in the side pieces E' E' of the rectangular frame E, of which E'' E''' are the forward and rear transverse bars. G is a cover for the cutter-cylinder. The side frame-pieces E' E' are pivoted to the lower ends of the axle A about one-third of their lengths from their forward ends, at $e\ e$, and the cylinder of cutters is journaled in said pieces E' E' about the same distance from their rear ends. G is the driver's seat, carried on a bar, $g$, which is connected to, and extends back from, the bar E'' to near the rear end of the frame E, and may be adjusted on the bar E'' by means of the bolt $g'$ in the slot $g''$. H H are the gathering-hooks suspended from the bar E''', as shown, and connected from near their central parts to the axle A by chains $h\ h$. I is a bent lever, pivoted at its bend to the tongue C. J is a bar, pivoted to the end of the bent lever I at its upper end, and its central part passing down through an elongated eye, $k$, in a projecting arm, $k'$.

The operation of our invention is as follows: As the machine is drawn forward the stalks are dragged into line nearly or quite parallel with the line of progression, and the cutters strike them transversely, cutting them into lengths equal to the distances between the cutters. The wheels B B running each in one of the furrows, generally on each side of the row of stalks, will aid in balancing and steadying the cylinder of cutters upon the ridge on which the stalks are usually found. The rear end of the frame E is perfectly free to vibrate with the cylinder of cutters without injury to the animals' necks, as they impart no great movement to the axle from their own constantly-recurring percussions. When it is necessary, as in the case of wet spots, or places with more than ordinarily heavy stalks, the driver may, by moving back in his seat, raise the wheels B B and axle A entirely from the ground, and of course thus add their weight in addition to his own to the weight on the cutters, and he may adjust the seat on the bar $g$ by bolt $g'$ for the same purpose. In the last-described operation the shaft $d$ becomes the fulcrum upon which the oscillation takes place, as will be seen by reference to the dotted line E'''' at Fig. 2. By the same means he may control the weight upon the cutters as desired. The dotted line I', Fig. 2, shows the position of the lever I, turned back to throw the lower end of the rod J upon the bar E'', and, as shown by the dotted lines at the same figure, depress the bar E'' and elevate the cylinder of cutters clear of the ground, the bar I resting on the elevated part of the axle A, and forming a lock to hold it in said elevated position for transportation from place to place.

It will be evident that as the forward end of the frame E is depressed the chains $h\ h$ will raise the hooks H H free from the ground.

Having now described our invention, what we claim as new, and desire to secure by Letters Patent, is—

1. The frame E, carrying the cylinder of cutters D and pivoted to the axle A, as described, and arranged to operate with the seat-bar $g$ and seat G, substantially as described, and for the purpose specified.

2. The lever I and arm J, arranged to operate with the draft-pole C, frame E, with cylinder of cutters D, and the axle A, and wheels B B, substantially as described, and for the purpose specified.

JOSIAH BABCOCK.
JOHN F. STILSON.

Witnesses:
J. J. TUNNICLIFF,
T. C. McCHESNEY.